P. D. FOSTER & F. A. GUETSCHOW.
ICE SAW.
APPLICATION FILED JAN. 13, 1915.
1,162,596.
Patented Nov. 30, 1915.
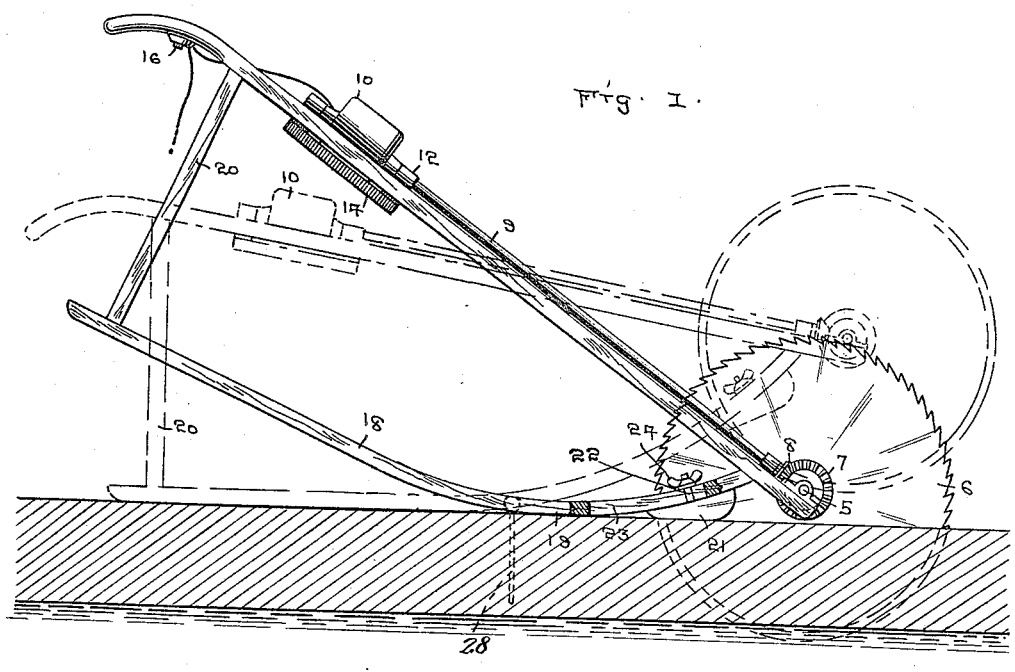
P. D. Foster & F. A. Guetschow, Inventors
Witnesses
Carey S. Frye
By W. J. Fitzgerald
Attorneys
COLUMBIA PLANOGRAPH CO., WASHINGTON, D. C.

UNITED STATES PATENT OFFICE.

PRUDEN DAVID FOSTER AND FREDERICK A. GUETSCHOW, OF BELOIT, WISCONSIN.

ICE-SAW.

1,162,596.

Specification of Letters Patent.

Patented Nov. 30, 1915.

Application filed January 13, 1915. Serial No. 2,015.

*To all whom it may concern:*

Be it known that we, PRUDEN DAVID FOSTER and FREDERICK A. GUETSCHOW, citizens of the United States, residing at Beloit, in the county of Rock and State of Wisconsin, have invented certain new and useful Improvements in Ice-Saws; and we do hereby declare the following to be a full, clear, and exact description of the invention, such as will enable others skilled in the art to which it appertains to make and use the same.

Our invention relates to new and useful improvements in ice saws, and our object is to provide a circular saw for cutting the ice and mounting the same upon a frame so that it can be moved over the surface of the ice.

A further object is to provide a suitable motor for operating the saw.

A further object is to provide means for placing the motor under the control of the operator so that when the forward movement of the saw over the ice is stopped, the motor will likewise stop. And a further object is to provide means for properly guiding the saw over the surface of the ice. And a still further object is to provide means for regulating the position of the saw to coincide with the thickness of the ice.

Other objects and advantages will be hereinafter set forth and more particularly pointed out in the accompanying specification.

In the accompanying drawings which are made a part of this application, Figure 1 is a side elevation partly in cross section of our improved device showing the same as applied to use in full lines and in inoperative position by dotted lines, and Fig. 2 is a top plan view thereof.

Referring to the drawings in which similar reference numerals designate corresponding parts throughout the several views, 1 indicates the frame which may be constructed in any preferred manner, but preferably consists of a pair of parallel bars 2 and 3, the forward ends of said bars having bearings 4 attached thereto in which is rotatably mounted a shaft 5 and on said shaft is fixedly mounted a circular saw 6 which saw is adapted to rotate with the shaft.

Fixed to one face of the saw is a bevel gear 7, with which meshes a beveled pinion 8 secured to one end of a driving shaft 9, the opposite end of said shaft being secured to a motor 10. That end of the shaft 9 adjacent the saw is rotatably mounted in a bracket 11, while the opposite end of the shaft is mounted in bearings 12 on the cross bars 13, the ends of said cross bars being connected respectively to the bars 2 and 3. Secured between the cross bars 13 is a bed plate 14, upon which the motor rests.

As shown in the drawings, we have employed an electric motor, the controlling wire 15 of which is extended to a switch 16, secured to the under face of one of the handles 17 so that when the handles are grasped to move the saw and frame forwardly, the switch will be grasped by the hand of the operator and turned into the motor and the motor will remain running so long as the hand of the operator grasps the handle, and will immediately cease operating when the handle is released.

In order to properly support the saw and at the same time provide means for readily propelling the saw and frame over the surface of the ice, we provide a pair of runners 18, the forward ends 19 of which are curved and extended into engagement with the bars 2 and 3 adjacent their forward ends, while the rear ends of the runners are attached to the rear portion of said bars by means of standards 20.

The motor 10 is preferably positioned adjacent the rear end of the frame so as to substantially equalize the weight of the saw and motor on the frame.

If preferred, a shoe 21 may be adjustably attached to the curved portions 19 of the runners so as to limit the descent of the saw and thereby adjust the same for operation upon ice of varying thickness, the shoe being preferably attached to the runners by extending a bolt 22 from the shoe through a slot 23 in the runner, the upper end of the bolt being threaded to receive a wing nut 24 whereby the shoe may be clamped in its adjusted position.

In order to guide the saw so as to saw the ice into strips of uniform width, a hollow arm 25 is extended outwardly from one of the runners and receives one end of a rod 26, said rod being adjustably secured in the arm by means of an adjusted screw 27, the outer end of the rod having a depending pin 28 which is adapted to enter the slot previously cut in the ice. And it will be readily seen that as long as the pin remains in said slot and the saw is moved forwardly, the strip of ice will be cut in uniform width.

It will also be seen that the device can be very cheaply constructed and by providing the runners can be easily moved over the surface of the ice, while the sawing operation is being performed.

It will likewise be understood that although we have shown an electric motor employed for driving the saw, any other form of motor may be as readily used and controlled as is the motor shown in the drawings.

What we claim is:—

A device for sawing ice, comprising a frame, runners attached to the frame and having its forward ends upwardly curved, said curved portions having longitudinally extending slots therethrough, a saw rotatably mounted between the forward ends of the frame, adjusting shoes, bolts extending from the shoes through said slots, means to clamp the shoes in adjusted relation with the runners to regulate the descent of the saw, and means to apply power to said saw to rotate the same.

In testimony whereof we have signed our names to this specification in the presence of two subscribing witnesses.

PRUDEN DAVID FOSTER.
FREDERICK A. GUETSCHOW.

Witnesses:
JOHN B. CLARK,
F. FULLER.

Copies of this patent may be obtained for five cents each, by addressing the "Commissioner of Patents, Washington, D. C."